United States Patent
Masuda et al.

(10) Patent No.: US 11,218,252 B2
(45) Date of Patent: Jan. 4, 2022

(54) TRANSMISSION DEVICE, RECEIVING DEVICE, AND WIRELESS COMMUNICATION SYSTEM

(71) Applicant: Mitsubishi Electric Corporation, Tokyo (JP)

(72) Inventors: Shinji Masuda, Tokyo (JP); Satoshi Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

(21) Appl. No.: 16/606,432

(22) PCT Filed: Jun. 15, 2017

(86) PCT No.: PCT/JP2017/022153
§ 371 (c)(1),
(2) Date: Oct. 18, 2019

(87) PCT Pub. No.: WO2018/229943
PCT Pub. Date: Dec. 20, 2018

(65) Prior Publication Data
US 2021/0111834 A1 Apr. 15, 2021

(51) Int. Cl.
*H04L 1/06* (2006.01)
*H04B 7/06* (2006.01)

(52) U.S. Cl.
CPC ......... *H04L 1/0643* (2013.01); *H04B 7/0615* (2013.01)

(58) Field of Classification Search
CPC .......................... H04B 7/0615; H04B 1/0643
See application file for complete search history.

(56) References Cited

U.S. PATENT DOCUMENTS 5,752,192 A * 5/1998 Hamabe ............... H04W 72/082
455/450
6,411,817 B1 * 6/2002 Cheng ................... H04W 52/20
370/318
(Continued)

FOREIGN PATENT DOCUMENTS

CA 2432215 A1 * 7/2002 ........... H04L 1/0618
CA 2432215 C * 1/2013 ........... H04L 1/0618
(Continued)

OTHER PUBLICATIONS

Al-Dhahir, A New High-Rate Differential Space-Time Blcok Coding Scheme, IEEE Communicaitons, vol. 7, No. 11, Nov. 2003 (Year: 2003).*

(Continued)

*Primary Examiner* — Berhanu Tadese
(74) *Attorney, Agent, or Firm* — Birch, Stewart, Kolasch & Birch, LLP (57) ABSTRACT

A base station, which is a transmission device according to the present invention, includes a space-time block coding unit that performs space-time block coding on a transmission symbol to generate a transmission block, a differential unit that performs a differential operation on the transmission block, a code multiplication unit that multiplies the transmission block by a code, a selection unit that selects one of the transmission block after the differential operation and the transmission block after the code multiplication, and wireless transmission units that transmit the transmission block selected.

10 Claims, 8 Drawing Sheets

(56) References Cited

U.S. PATENT DOCUMENTS

| | | | | |
|---|---|---|---|---|
| 7,397,866 | B2* | 7/2008 | Hwang | H04L 1/0618 375/316 |
| 7,567,623 | B2* | 7/2009 | Nam | H04B 7/0669 375/295 |
| 7,594,010 | B2* | 9/2009 | Dohler | H04B 7/2606 370/328 |
| 7,769,097 | B2* | 8/2010 | Sandhu | H04L 27/36 375/267 |
| 7,864,876 | B2* | 1/2011 | Nam | H04L 1/0643 375/267 |
| 7,876,840 | B2* | 1/2011 | Tong | H04L 1/0072 375/260 |
| 7,890,068 | B2* | 2/2011 | Hidaka | H04L 1/1809 455/132 |
| 7,969,955 | B2* | 6/2011 | Wang | H04L 1/0618 370/342 |
| 8,064,528 | B2* | 11/2011 | Giannakis | H04L 27/2613 375/260 |
| 8,130,693 | B2* | 3/2012 | Miller | H04B 7/1858 370/316 |
| 8,194,775 | B2* | 6/2012 | Abou Rjeily | H04B 1/71635 375/267 |
| 8,923,458 | B2* | 12/2014 | Seo | H04B 7/0891 375/347 |
| 9,001,939 | B2* | 4/2015 | Akutagawa | H04L 1/0631 375/343 |
| 9,048,899 | B2* | 6/2015 | Murakami | H04B 7/0456 |
| 9,088,447 | B1* | 7/2015 | Koike-Akino | H04B 7/0413 |
| 9,225,406 | B2* | 12/2015 | Murakami | H04B 7/0456 |
| 9,264,118 | B1* | 2/2016 | Koike-Akino | H04L 1/0631 |
| 9,300,380 | B2* | 3/2016 | Murakami | H04B 7/0615 |
| 10,110,347 | B2* | 10/2018 | Gresset | H04L 1/0618 |
| 10,637,550 | B2* | 4/2020 | Park | H04B 17/24 |
| 2001/0005395 | A1* | 6/2001 | Jin | H04L 5/0062 375/224 |
| 2003/0072395 | A1* | 4/2003 | Jia | H04L 25/0236 375/341 |
| 2005/0063483 | A1* | 3/2005 | Wang | H04L 1/0618 375/267 |
| 2005/0135499 | A1* | 6/2005 | Nam | H04L 1/0643 375/267 |
| 2006/0045201 | A1 | 3/2006 | Chae et al. | |
| 2006/0056539 | A1* | 3/2006 | Nam | H04L 1/0643 375/299 |
| 2006/0274846 | A1* | 12/2006 | Bauch | H04L 1/0071 375/267 |
| 2008/0089451 | A1* | 4/2008 | Taylor | H04L 12/40006 375/346 |
| 2008/0192857 | A1 | 8/2008 | Miyoshi et al. | |
| 2009/0253448 | A1* | 10/2009 | Kwon | H04B 17/345 455/501 |
| 2010/0062802 | A1* | 3/2010 | Amram | H04B 7/086 455/556.1 |
| 2010/0067365 | A1* | 3/2010 | Furukawa | H04B 7/0669 370/208 |
| 2010/0254300 | A1* | 10/2010 | Gulasekaran | H04B 7/2606 370/315 |
| 2010/0316165 | A1* | 12/2010 | Lee | H04B 7/026 375/308 |
| 2011/0317742 | A1* | 12/2011 | Kawahatsu | H04L 1/0003 375/132 |
| 2012/0300877 | A1* | 11/2012 | Murakami | H04L 25/03942 375/296 |
| 2012/0314800 | A1* | 12/2012 | Akutagawa | H04L 27/2071 375/295 |
| 2013/0022058 | A1* | 1/2013 | Akutagawa | H04L 7/041 370/476 |
| 2013/0050144 | A1* | 2/2013 | Reynolds | G06F 3/0445 345/174 |
| 2013/0089164 | A1* | 4/2013 | Murakami | H04L 25/03343 375/295 |
| 2013/0121438 | A1* | 5/2013 | Murakami | H04B 7/06 375/295 |
| 2013/0294552 | A1* | 11/2013 | Akutagawa | H04L 1/0091 375/343 |
| 2014/0198751 | A1* | 7/2014 | Prasad | H04B 7/024 370/329 |
| 2014/0286451 | A1* | 9/2014 | Murakami | H04L 1/0045 375/267 |
| 2015/0003554 | A1* | 1/2015 | Kato | H04L 1/0631 375/267 |
| 2015/0036698 | A1* | 2/2015 | Umeda | H04L 27/2613 370/503 |
| 2015/0103941 | A1* | 4/2015 | Murakami | H04L 25/03942 375/267 |
| 2015/0110220 | A1* | 4/2015 | Murakami | H04B 7/0465 375/295 |
| 2015/0208403 | A1* | 7/2015 | Takeda | H04L 5/0053 370/329 |
| 2016/0056872 | A1* | 2/2016 | Murakami | H04B 7/0456 375/267 |
| 2016/0134398 | A1* | 5/2016 | Lopez | H04B 7/0669 370/329 |
| 2016/0233984 | A1* | 8/2016 | Akutagawa | H04B 1/04 |
| 2016/0329981 | A1* | 11/2016 | Chung | H04W 72/042 |
| 2016/0337024 | A1* | 11/2016 | Masuda | H04B 7/0682 |
| 2016/0376640 | A1* | 12/2016 | Ross | G01N 15/042 436/501 |
| 2018/0097548 | A1* | 4/2018 | Kim | H04B 7/0478 |
| 2018/0139010 | A1* | 5/2018 | Gresset | H04L 1/005 |
| 2018/0248607 | A1* | 8/2018 | Park | H04B 7/0626 |
| 2019/0068303 | A1* | 2/2019 | Gao | H04L 5/005 |
| 2019/0074883 | A1* | 3/2019 | Park | H04B 7/0626 |
| 2019/0296838 | A1* | 9/2019 | Hessler | H04L 5/0051 |
| 2020/0112389 | A1* | 4/2020 | Fakoorian | H04L 1/0067 |
| 2020/0127765 | A1* | 4/2020 | Sasaki | H04L 27/233 |
| 2020/0382168 | A1* | 12/2020 | Sasaki | H04B 17/309 |
| 2021/0058930 | A1* | 2/2021 | Zhou | H04B 7/0617 |
| 2021/0111834 | A1* | 4/2021 | Masuda | H04L 1/0643 |

FOREIGN PATENT DOCUMENTS

| | | | | |
|---|---|---|---|---|
| CN | 1484899 A | * | 3/2004 | H04L 1/0618 |
| CN | 101091341 A | | 12/2007 | |
| CN | 1750448 B | * | 8/2010 | H04B 7/0669 |
| CN | 103248459 A | * | 8/2013 | H04B 7/0891 |
| CN | 104145462 A | * | 11/2014 | H04L 1/0618 |
| CN | 110741582 A | * | 1/2020 | H04B 7/0854 |
| DE | 60035439-D1 | * | 8/2007 | H04L 1/0618 |
| EP | 1 357 693 A1 | | 10/2003 | |
| EP | 1378088 A1 | * | 1/2004 | H04L 1/0618 |
| EP | 1635499 A2 | * | 3/2006 | H04L 1/0668 |
| EP | 1883193 A2 | * | 1/2008 | H04L 25/03885 |
| EP | 1635499 A3 | * | 4/2011 | H04B 7/0669 |
| EP | 2822245 A1 | * | 1/2015 | H04L 1/0618 |
| EP | 1635499 B1 | * | 7/2016 | H04B 7/0669 |
| EP | 3624375 A1 | * | 3/2020 | H04J 13/18 |
| EP | 3624375 A4 | * | 6/2020 | H04B 7/024 |
| JP | 2008-511245 A | | 4/2008 | |
| JP | 5763963 B2 | | 8/2015 | |
| JP | 6587781 B2 | * | 10/2019 | H04B 7/0854 |
| KR | 20040014441 A | * | 2/2004 | H04L 1/0618 |
| KR | 20060024297 A | * | 3/2006 | H04L 1/0643 |
| KR | 100721068 B1 | * | 5/2007 | H04L 1/0618 |
| WO | WO-02052773 A1 | * | 7/2002 | H04L 1/0618 |
| WO | WO-2012092751 A | * | 7/2012 | H04L 5/0073 |
| WO | WO-2013129422 A1 | * | 9/2013 | H04L 1/0631 |
| WO | WO-2016194196 A1 | * | 12/2016 | H04B 7/02 |
| WO | WO-2018207281 A | * | 11/2018 | H04L 1/0625 |
| WO | WO-2018229943 A1 | * | 12/2018 | H04L 1/0643 |
| WO | WO-2020144866 A1 | * | 7/2020 | H04B 7/08 |

OTHER PUBLICATIONS

Written Opinion of the ISA for PCT/JP2017/022153, dated Aug. 29, 2017 (Year: 2017).*

(56) References Cited

OTHER PUBLICATIONS

Al-Dhahir, A New High-Rate Differential Space-Time Block Coding Scheme, IEEE Communications, vol. 7, No. 11, Nov. 2003 (Year: 2003).*

V. Tarokh et al., A Differential Detection Scheme for Transmit Diversity, IEEE Journal on Selected Areas in Communications, vol. 18, No. 7, Jul. 2000 (Year: 2000).*

Tarokh et al., "A Differential Detection Scheme for Transmit Diversity," IEEE Journal on Selected Areas in Communications, vol. 18, No. 7, Jul. 2000, pp. 1169-1174.

Office Action dated Oct. 29, 2021 in corresponding Indian Patent Application No. 201947047697.

Office Action dated Sep. 27, 2021 in corresponding Chinese Application No. 201780091746.X.

* cited by examiner

TRANSMISSION DEVICE, RECEIVING DEVICE, AND WIRELESS COMMUNICATION SYSTEM

FIELD

The present invention relates to a transmission device that transmits a space-time block coded signal, to a receiving device that receives a signal transmitted from this transmission device, and to a wireless communication system including this transmission device.

BACKGROUND

A transmit diversity technique is used in wireless communication as a technique for improving performance with respect to fading in a transmission path. One transmit diversity technique is to generate multiple orthogonal series by performing space-time block coding (STBC) on a transmission series, and then transmit these series respectively from different antennas. Research is currently being conducted on a differential space-time block coding (DSTBC) technique based on a combination of STBC and differential coding requiring no estimation of the state of the transmission path in the receiving device. Non-Patent Literature 1 discloses a transmission method including performing differential space-time block coding on every two phase-modulated symbols, and transmitting the differential space-time block coded signal using two transmission antennas; and a receiving method for receiving such signal.

CITATION LIST

Non-Patent Literature

Non-Patent Literature 1: V. Tarokh and H. Jafarkhani, "A Differential Detection Scheme for Transmit Diversity", IEEE Journal On Selected Areas In Communications, Vol. 18, No. 7, July 2000.

SUMMARY

Technical Problem

A wireless communication system that offers a wireless communication service to mobile stations deploys multiple base stations to cover the entire service area. In this regard, a range that allows a mobile station to communicate with a single base station is referred to herein as communication area. A mobile station moving within a service area maintains communication by changing base stations to communicate with. To avoid disconnection of communication even when a mobile station moves across multiple communication areas, base stations are arranged to allow the communication areas of adjacent base stations to overlap each other.

When adjacent base stations each transmit a signal at a same frequency, overlapping of communication areas of such base stations causes a signal transmitted from one of the adjacent base stations to act as an interference signal for the mobile station in communication with another one of the adjacent base stations. This presents a problem of degradation in received signal quality on the mobile station due to the interference signal.

One example of a method for resolving this problem is that a mobile station performs processing called interference mitigation processing that removes the effect of interference signal. Interference mitigation processing is performed such that a mobile station estimates the interference signal being received, and removes the estimated interference signal component from the received signal. To perform interference mitigation processing, the mobile station needs to estimate the state of the transmission path, that is, perform transmission path estimation. However, a mobile station performs no transmission path estimation in a conventional wireless communication system that uses a differential space-time block coding technique, thereby presenting a problem of incapability of providing interference mitigation processing.

The present invention has been made to resolve the foregoing problem, and it is an object of the present invention to provide a transmission device capable of mitigating the effect of interference signal in a receiving device in a wireless communication system that uses a differential space-time block coding technique.

Solution to Problem

To solve the problem and achieve the object described above, a transmission device according to the present invention includes a space-time block coding unit that performs space-time block coding on a transmission symbol to generate a transmission block, a differential unit that performs a differential operation on the transmission block, and a code multiplication unit that multiplies the transmission block by a code. This transmission device further includes a selection unit that selects one of the transmission block after the differential operation and the transmission block after the code multiplication, and a transmission unit that transmits the transmission block selected.

Advantageous Effects of Invention

A transmission device according to the present invention provides an advantage in being capable of mitigating the effect of interference signal in a receiving device in a wireless communication system that uses a differential space-time block coding technique.

DESCRIPTION OF EMBODIMENT

A transmission device, a receiving device, and a wireless communication system according to an embodiment of the present invention will be described in detail below with reference to the drawings. Note that this embodiment is not intended to limit the scope of this invention.

Embodiment

Figure 1:
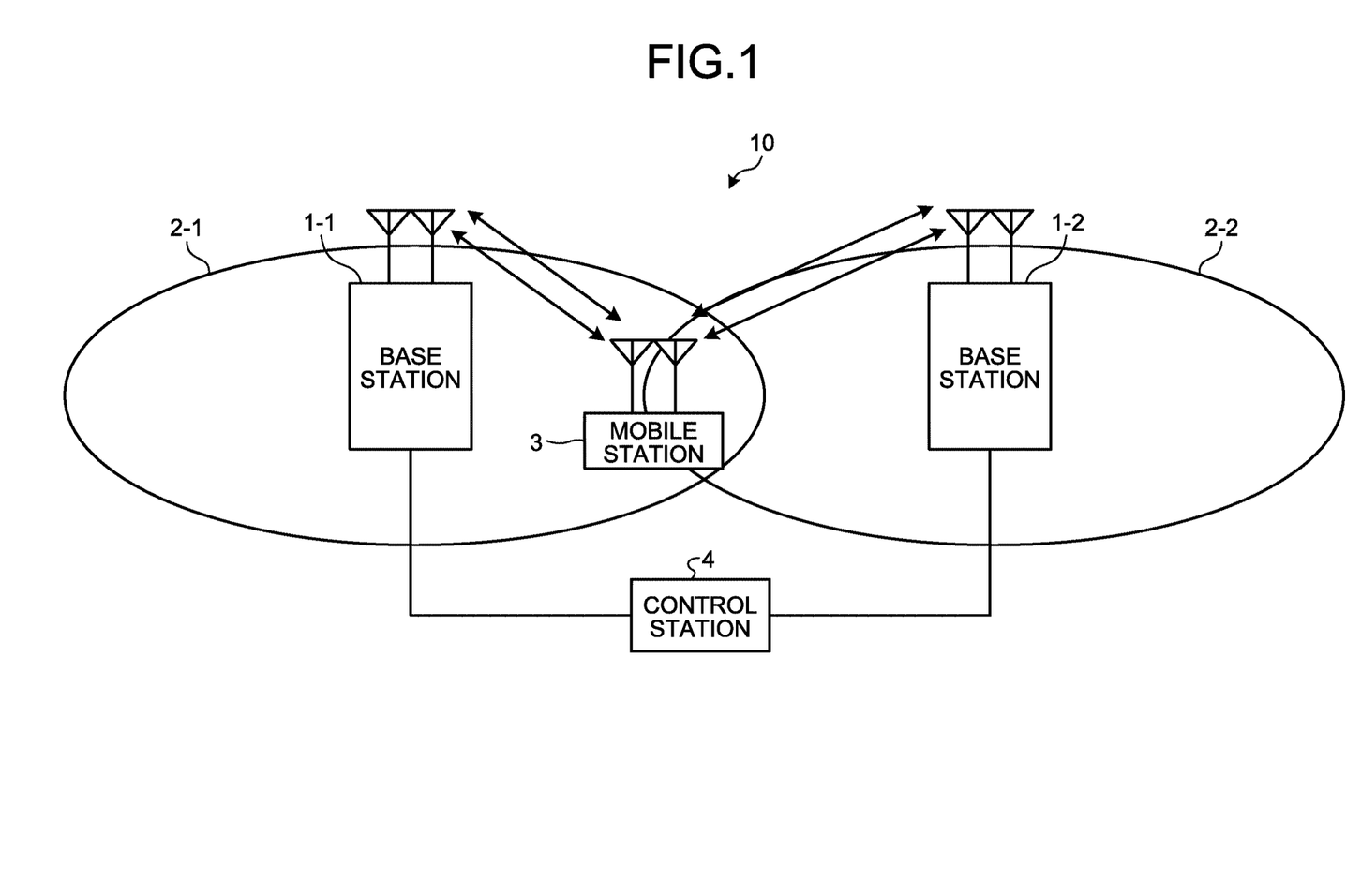
FIG. 1 is a diagram illustrating an example configuration of a wireless communication system according to an embodiment.

FIG. 1 is a diagram illustrating an example configuration of a wireless communication system according to an embodiment of the present invention. As illustrated in FIG. 1, a wireless communication system 10 of the present embodiment includes base stations 1-1 and 1-2, a mobile station 3, and a control station 4.

The base station 1-1 forms a communication area 2-1, and the base station 1-2 forms a communication area 2-2. The communication area 2-1 is an area in which the mobile station 3 can receive a signal transmitted from the base station 1-1. The communication area 2-2 is an area in which the mobile station 3 can receive a signal transmitted from the base station 1-2. The communication area 2-1 and the communication area 2-2 partially overlap each other. As used herein, the base stations 1-1 and 1-2 are referred to as base station(s) 1 when no distinction is made therebetween, and the communication areas 2-1 and 2-2 are referred to as communication area(s) 2 when no distinction is made therebetween.

The base station 1 includes multiple antennas, which enable a wireless signal to be transmitted to the mobile station 3. The control station 4 is connected with the base stations 1 by wire to control the base stations 1. Note that the control station 4 and each of the base stations 1 may be connected wirelessly. Under the control of the control station 4, the base stations 1 each transmit wirelessly a control signal containing information required for wireless communication with the mobile station 3. Upon entering the communication area 2 of the base station 1, the mobile station 3 receives a control signal transmitted from the base station 1 servicing that communication area 2, and establishes a wireless connection with the base station 1 based on the control signal. This thereafter allows the mobile station 3 to wirelessly communicate with the base station 1. The control station 4 provides control of the base stations 1 for the operation of the wireless communication system 10, and there are no specific limitations on what control is to be provided. For example, the control station 4 instructs the base station 1 on the signal to be transmitted. For example, the control station 4 transmits data that is to be transmitted by the base station 1 to the base station 1, and/or instructs the base station 1 on a parameter to be used by the base station 1 in a process described below. Examples of the parameter include a code described below, and the modulation scheme to be used in modulation operation.

The numbers of the base stations 1, of the mobile stations 3, and of the control stations 4 included in the wireless communication system 10 are not limited to the numbers thereof in the example illustrated in FIG. 1. In general, the wireless communication system 10 includes multiple base stations 1 to form a service area along a certain track, or a service area expanding in two or more directions over the ground. For example, in a case in which the wireless communication system 10 includes three or more base stations 1 to form a service area along a track, a communication area of a base station not illustrated is arranged to overlap the communication area 2-2 to the right of the base station 1-2 in FIG. 1 as viewed into the paper. Thus, deployment of base stations to allow the communication areas of adjacent base stations to overlap each other provides a service area along a track. In addition, in a case in which the wireless communication system 10 forms a service area expanding in two or more directions over the ground, a communication area of a base station not illustrated is arranged, for example, to overlap the communication area 2-1 at least one of on the top of, at the bottom of, obliquely upward of, and obliquely downward of the base station 1-1 in FIG. 1.

In the present embodiment, description will be presented below in terms of a configuration and an operation related to downlink communication, i.e., communication in the direction from the base station 1 to the mobile station 3. In downlink communication, the base station 1 serves as a transmission device, while the mobile station 3 serves as a receiving device. Uplink communication, i.e., communication in the direction from the mobile station 3 to the base station 1, may be provided in any configuration using any operation. Moreover, the mobile station 3 and the base station 1 may be configured not to have functionality of uplink communication.

Figure 2:
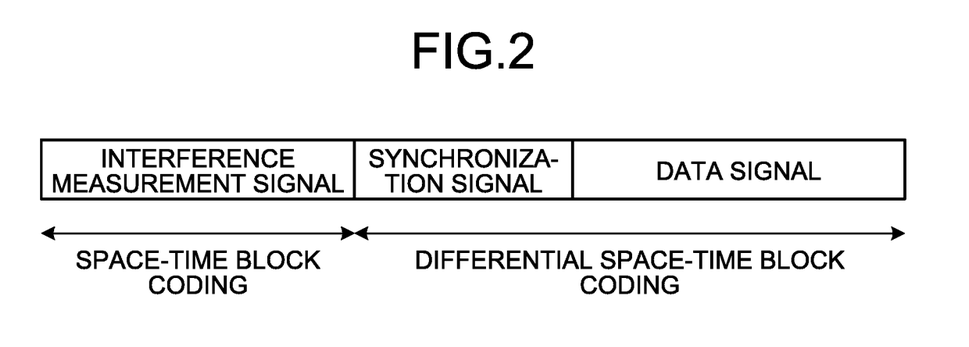
FIG. 2 is a diagram illustrating an example of frame format of a frame used in downlink communication of the wireless communication system.

FIG. 2 is a diagram illustrating an example of frame format of a frame used in downlink communication of the wireless communication system 10 of the present embodiment. As illustrated in FIG. 2, the frame used in downlink communication of the wireless communication system 10 of the present embodiment includes an interference measurement signal, a synchronization signal, and a data signal. The interference measurement signal is used by the mobile station 3 to measure an interference signal, which is a received signal that acts as an interference component. Interference signal measurement will be described later herein. The synchronization signal is used by the mobile station 3 to synchronize the frame. Frame synchronization is a process for detecting a start of a frame or a predetermined position of a frame. The synchronization signal is, for example, a predetermined bit sequence. The synchronization signal may be any synchronization signal. The data signal is information transmitted from the base station 1 to the mobile station 3. Note that the frame format illustrated in FIG. 2 is provided merely by way of example. The order of arrangement of the interference measurement signal, the synchronization signal, and the data signal is not limited to the order in the example illustrated in FIG. 2.

In the present embodiment, as illustrated in FIG. 2, the base station 1 performs differential space-time block coding on the synchronization signal and on the data signal, and space-time block coding on the interference measurement signal. As described in detail below, this operation eliminates the need for the mobile station 3 having received a signal transmitted from the base station 1 to perform transmission path estimation during decoding of the data signal, but allows transmission path estimation to be performed using the interference measurement signal received, thereby enabling interference mitigation processing to be performed.

The interference measurement signal includes one or more blocks. As used herein, the term "block" refers to a unit of data for performing space-time block coding and differential space-time block coding. Generally, in terms of space-time block coding and differential space-time block coding, one block has as many symbols as the number of transmission antennas. For example, when there are two transmission antennas, two symbols form one block. A symbol is a piece of data having one of more bits. In a case in which modulation is performed before the space-time block coding and the differential space-time block coding, the symbol is a unit of data of modulation, i.e., a modulated symbol. For example, when a modulation scheme that operates in units of two bits such as quadrature phase shift keying (QPSK) is used, one symbol has two bits, while when a modulation scheme that operates in units of one bit such as binary phase shift keying (BPSK) is used, one symbol has one bit.

Figure 3:
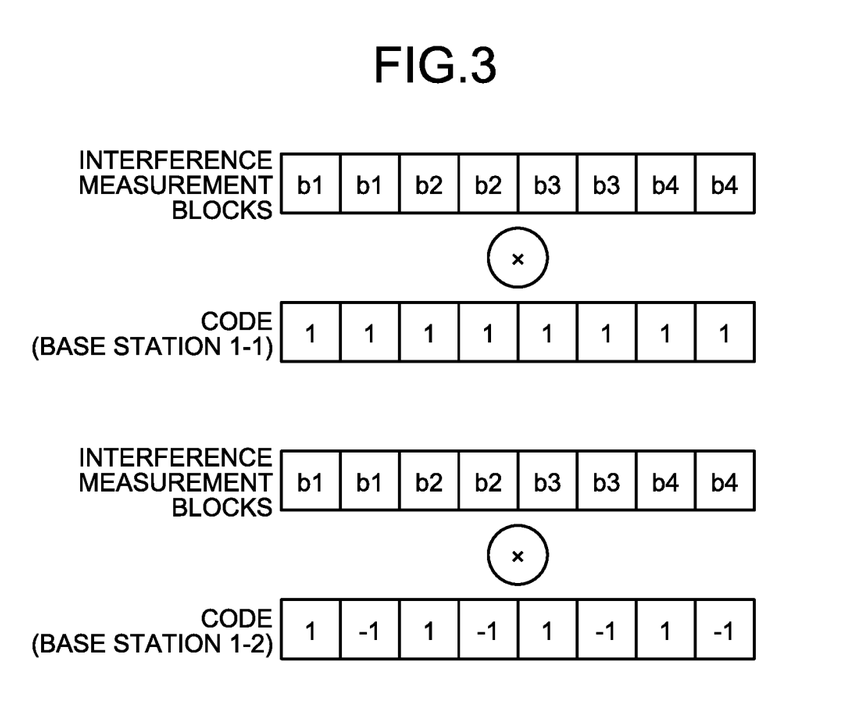
FIG. 3 is a diagram illustrating an example structure of an interference measurement signal.

FIG. 3 is a diagram illustrating an example structure of the interference measurement signal of the present embodiment. In the example illustrated in FIG. 3, the interference measurement signal has eight blocks per frame. A block included in the interference measurement signal is hereinafter also referred to as interference measurement block. An interference measurement block includes interference measurement bits. The interference measurement bits may be any data. FIG. 3 illustrates an example in which four types of interference measurement blocks b1, b2, b3, and b4 are each transmitted twice. That is, two identical interference measurement blocks are consecutively transmitted. The number of the interference measurement blocks included in the interference measurement signal per frame is not limited to 8, but the interference measurement signal may include any number of interference measurement blocks. Moreover, the number of times of transmission of an identical interference measurement block is not limited to 2, but an identical interference measurement block may be transmitted any number of times.

In the present embodiment, the set of eight interference measurement blocks in one frame is multiplied by a code. This code differs between the base stations 1. That is, the code is determined for each transmission device. Note that not all the base stations 1 need to have a different code assigned thereto, but different codes need to be assigned to base stations 1 that may cause interference with each other, such as adjacent ones of the base stations 1. This enables the mobile station 3 to identify the interference measurement signals received from the respective base stations 1. The codes for use by ones of the base stations 1 that may cause interference with each other are desirably orthogonal to each other.

In addition, the set of blocks is multiplied by a code orthogonal to another code among base stations that may cause interference with each other. The example illustrated in FIG. 3 uses a code "+1, +1, +1, +1, +1, +1, +1, +1" as a code $e_k$ used by the base station 1-1 in the multiplication of the interference measurement signal, and uses a code "+1, −1, +1, −1, +1, −1, +1, −1" as a code $f_k$ used by the base station 1-2 in the multiplication of the interference measurement signal. The code $e_k$ and the code $f_k$ are orthogonal to each other. Note that the portions of the codes corresponding to the k-th block are respectively denoted by $e_k$ and $f_k$. For example, assuming that the example illustrated in FIG. 3 has eight blocks from k=0 to k=7, the example illustrated in FIG. 3 has values of $e_0$=+1, $f_0$=+1, $e_1$=+1, $f_1$=−1, and the like.

Figure 4:
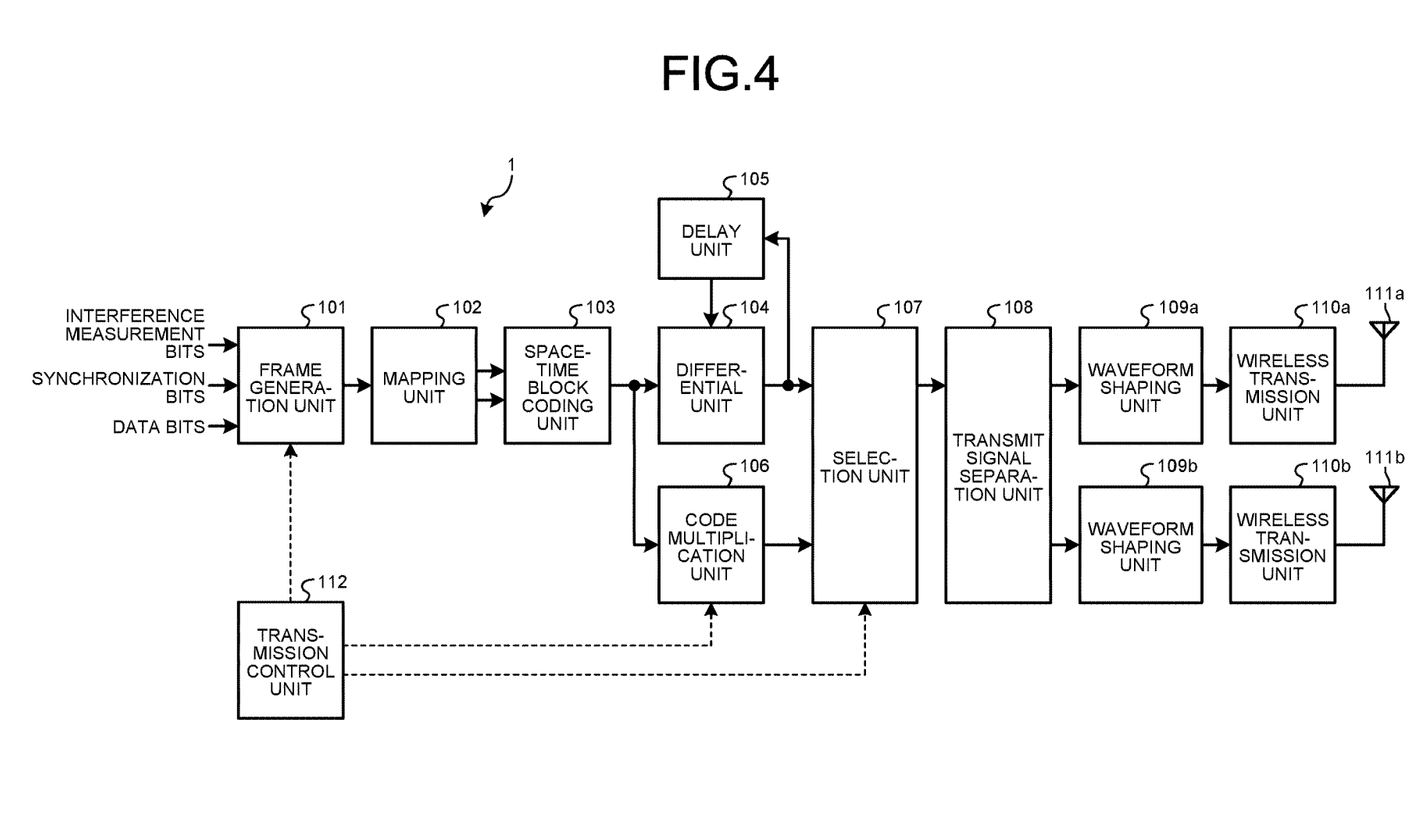
FIG. 4 is a diagram illustrating an example configuration of a base station.

FIG. 4 is a diagram illustrating an example configuration of the base station 1 of the present embodiment. The base station 1 serves as a transmission device in downlink communication, and includes, as illustrated in FIG. 4, a frame generation unit 101, a mapping unit 102, a space-time block coding unit 103, a differential unit 104, a delay unit 105, a code multiplication unit 106, a selection unit 107, a transmit signal separation unit 108, waveform shaping units 109a and 109b, wireless transmission units 110a and 110b, transmission antennas 111a and 111b, and a transmission control unit 112. Note that, in FIG. 4, a solid line represents a path of transmitted data, and a broken line represents a path of an instruction signal provided from the transmission control unit 112.

Figure 5:
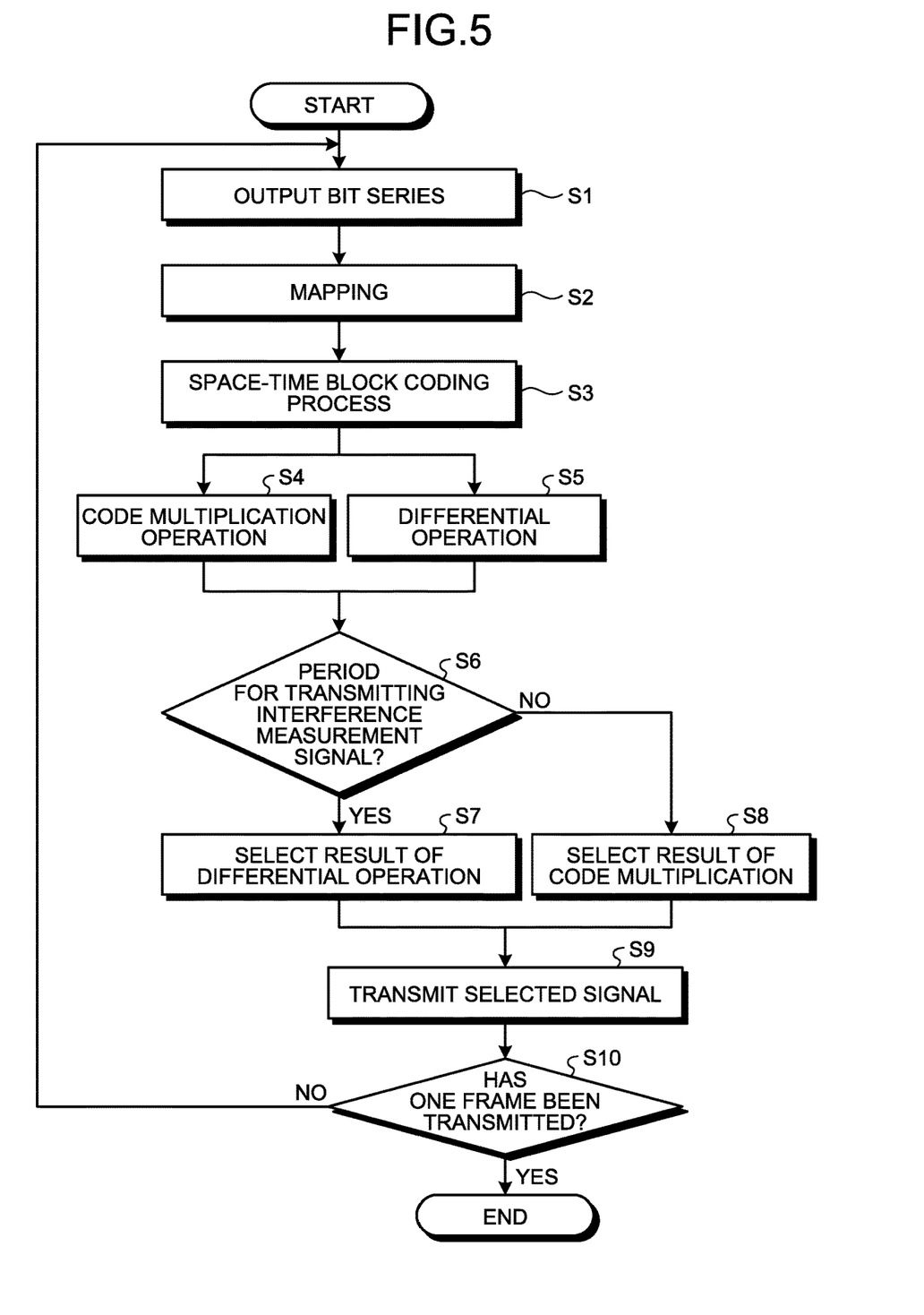
FIG. 5 is a flowchart illustrating an example of transmission operation procedure in the base station of the embodiment.

FIG. 5 is a flowchart illustrating an example of transmission operation procedure in the base station 1 of the present embodiment. Referring to FIGS. 4 and 5, an operation of the base station 1 of the present embodiment will now be described. Note that FIG. 5 illustrates a transmission operation procedure for one frame. It is assumed here that the base station 1-1 and the base station 1-2 are synchronized with each other with respect to transmission timing. Transmission timing may be synchronized between the base stations 1 in any manner, and one method is, for example, to allow the control station 4 to inform each of the base stations 1 of the transmission timing. Other examples of the method may include to synchronize the transmission timing by means of time synchronization using a global positioning system (GPS); and to provide synchronization by defining one of the base stations 1 as the master station and allowing another one of the base stations 1 to synchronize with this master base station 1 using any time synchronization method using wireless communication or wired communication.

As illustrated in FIG. 5, the frame generation unit 101 of the base station 1 outputs interference measurement bits, which are the data to be transmitted as an interference measurement signal, synchronization bits, which are the data to be transmitted as a synchronization signal, and data bits, which are the data to be transmitted as a data signal, to the mapping unit 102 based on an instruction from the transmission control unit 112 (step S1). The transmission control unit 112 instructs the frame generation unit 101 about the timing for outputting the bits to allow the interference measurement bits, the synchronization bits, and the data bits to be sequentially output from the frame generation unit 101 in the order defined by the frame format. Note that the interference measurement bits, the data bits, and the synchronization bits may be input from the transmission control unit 112 to the frame generation unit 101, be generated in a data generation unit (not illustrated) and then input to the frame generation unit 101, or be transmitted from the control station 4.

The mapping unit 102 maps a bit set output from the frame generation unit 101 onto a symbol represented by a complex number, and outputs the mapped symbol, i.e., transmission symbol, to the space-time block coding unit 103 (step S2). That is, the mapping unit 102 modulates a bit set output from the frame generation unit 101 to generate a transmission symbol, and outputs the transmission symbol to the space-time block coding unit 103. The mapping unit 102 may use any mapping method in this operation, and can use, for example, a mapping method according to a QPSK modulation scheme.

Figure 6:
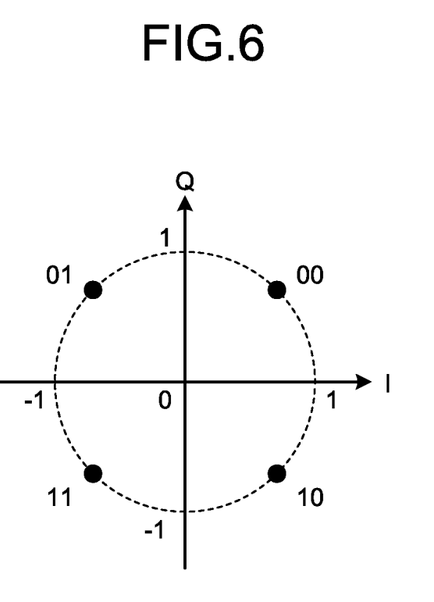
FIG. 6 is a diagram illustrating an example of QPSK mapping.

FIG. 6 is a diagram illustrating an example of QPSK mapping. In FIG. 6, the horizontal axis is an I-axis representing the real part of a complex number, and the vertical axis is a Q-axis representing the imaginary part of a complex number. As illustrated in FIG. 6, QPSK mapping is performed such that a pair of two bits is mapped onto four constellation points on a circumference of a unit circle. Specifically, the bit set "00" is mapped onto a point at an angle of π/4 [rad]; the bit set "01" is mapped onto a point at an angle of 3π/4 [rad]; the bit set "11" is mapped onto a point at an angle of 5π/4 [rad]; and the bit set "10" is mapped onto a point at an angle of 7π/4 [rad], where the angle of a constellation point on the I-Q plane described above represents an angle from the I-axis.

Returning back to the description of FIG. 5, after step S2, the space-time block coding unit 103 performs a space-time block coding process on the symbol output from the mapping unit 102, i.e., the transmission symbol (step S3). Specifically, the space-time block coding unit 103 generates a matrix, i.e., a transmission block, for each block, and outputs the transmission block to the differential unit 104 and to the code multiplication unit 106, where each block includes as many symbols as the number of the transmission antennas. That is, the space-time block coding unit 103 performs space-time block coding on the transmission symbols to generate a transmission block. The following description assumes that, as illustrated in FIG. 4, there are two transmission antennas, that is, two symbols form one block. Denoting the two symbols included in a k-th block (where k is an integer of 0 or greater) respectively by $s_{k,1}$ and $s_{k,2}$, the space-time block coding unit 103 generates a matrix $S(\text{in bold})_k$, which can be represented by Formula (1) below.

[Formula 1]

$$S_k = \begin{bmatrix} s_{k,1} & s_{k,2} \\ -s_{k,2}^* & s_{k,1}^* \end{bmatrix} \quad (1)$$

The differential unit 104 performs a differential operation using the matrix $S(\text{in bold})_k$ output from the space-time block coding unit 103 and a matrix $C(\text{in bold})_{k-1}$ output from the delay unit 105 (step S5). The differential unit 104 performs the differential operation on the transmission block. Specifically, the differential unit 104 multiplies together the matrix $S(\text{in bold})_k$ and the matrix $C(\text{in bold})_{k-1}$ to generate a matrix $C(\text{in bold})_k$ as given by Formula (2) below, and outputs the product thereof to the selection unit 107 and to the delay unit 105. The matrix $C(\text{in bold})_{k-1}$ is a matrix generated by the processing of the differential unit 104 performed on the immediately previous block, i.e., the k−1-th block. The delay unit 105 holds the matrix $C(\text{in bold})_k$ input from the differential unit 104, and outputs this matrix $C(\text{in bold})_k$ to the differential unit 104 upon processing of the next block.

[Formula 2]

$$\begin{aligned} C_k &= \begin{bmatrix} c_{k,1} & c_{k,2} \\ -c_{k,2}^* & c_{k,1}^* \end{bmatrix} \\ &= S_k \cdot C_{k-1} \\ &= \begin{bmatrix} s_{k,1} & s_{k,2} \\ -s_{k,2}^* & s_{k,1}^* \end{bmatrix} \begin{bmatrix} c_{k-1,1} & c_{k-1,2} \\ -c_{k-1,2}^* & c_{k-1,1}^* \end{bmatrix} \end{aligned} \quad (2)$$

Meanwhile, the code multiplication unit 106 multiplies the matrix $S(\text{in bold})_k$ output from the space-time block coding unit 103 by a code (step S4). That is, the code multiplication unit 106 multiplies the transmission block by a code. The code used in the multiplication of the matrix $S(\text{in bold})_k$ by the code multiplication unit 106 is, as described with reference to FIG. 3, a code determined for each of the base stations 1. The code used in the multiplication of the matrix $S(\text{in bold})_k$ by the code multiplication unit 106 is notified from the transmission control unit 112. Note that the code used for each of the base stations 1 may be set in advance in the transmission control unit 112 of each of the base stations 1, or be held in the transmission control unit 112 under instruction of the control station 4. Assuming that, as in the example illustrated in FIG. 3, the code multiplication unit 106 of the base station 1-1 uses the code $e_k$, the code multiplication unit 106 of the base station 1-1 multiplies the matrix $S(\text{in bold})_k$ by the code $e_k$ to generate a matrix $C(\text{in bold})'_k$ as given by Formula (3) below, and outputs the matrix $C(\text{in bold})'_k$ to the selection unit 107.

[Formula 3]

$$\begin{aligned} C'_k &= e_k S_k \\ &= e_k \begin{bmatrix} s_{k,1} & s_{k,2} \\ -s_{k,2}^* & s_{k,1}^* \end{bmatrix} \end{aligned} \quad (3)$$

The transmission control unit 112 determines whether it is in the period for transmitting an interference measurement signal based on the frame format (step S6). If it is in the period for transmitting an interference measurement signal (Yes at step S6), the transmission control unit 112 instructs the selection unit 107 to select the result of the differential operation, i.e., the matrix $C(\text{in bold})_k$ (step S7). The selection unit 107 then selects the matrix $C(\text{in bold})_k$ output from the differential unit 104 as instructed by the transmission control unit 112, and outputs the matrix $C(\text{in bold})_k$ to the transmit signal separation unit 108.

If it is not in the period for transmitting an interference measurement signal, that is, if it is in the period for transmitting a synchronization signal or a data signal (No at step S6), the transmission control unit 112 instructs the selection unit 107 to select the result of the code multiplication, i.e., the matrix $C(\text{in bold})'_k$ (step S8). The selection unit 107 then selects the matrix $C(\text{in bold})'_k$ output from the code multiplication unit 106 as instructed by the transmission control unit 112, and outputs the matrix $C(\text{in bold})'_k$ to the transmit signal separation unit 108. That is, the selection unit 107 selects one of the transmission block after the differential operation and the transmission block after the code multiplication.

After step S7 and after step S8, the base station 1 transmits the matrix output from the selection unit 107 as a wireless signal (step S9). Specifically, the transmit signal separation unit 108 separates the signal input from the selection unit 107 into two signals corresponding to the respective transmission antennas 111a and 111b. In more detail, the transmit signal separation unit 108 outputs the two symbols from the first column of the matrix output from the selection unit 107 to the waveform shaping unit 109a corresponding to the transmission antenna 111a, and outputs the two symbols from the second column of the matrix output from the selection unit 107 to the waveform shaping unit 109b corresponding to the transmission antenna 111b. Note that use of only one transmission antenna does not require the transmit signal separation unit 108.

For example, in a case in which the selection unit 107 outputs the matrix $C(\text{in bold})_k$ as the output matrix, the transmit signal separation unit 108 outputs the elements $c_{k,1}$ and $-c^*_{k,2}$ to the waveform shaping unit 109a, and outputs the elements $c_{k,2}$ and $c^*_{k,1}$ to the waveform shaping unit 109b. The waveform shaping units 109a and 109b shape the waveforms of the respective input signals using, for example, a root Nyquist filter, and output the waveform-shaped signals respectively to the wireless transmission units 110a and 110b. Note that the processing in the waveform shaping units 109a and 109b is not limited to waveform shaping using a root Nyquist filter, but may be any general waveform shaping process. Note that the waveform shaping units 109a and 109b may be part of the respective wireless transmission units 110a and 110b. The wireless transmission units 110a and 110b perform processing such as digital-to-analog (DA) conversion, up-conversion, and amplification on the respective signals output from the waveform shaping units 109a and 109b, and transmit the respective processed signals from the transmission antennas 111a and 111b. The wireless transmission unit 110a and the wireless transmission unit 110b are transmission units for transmitting the transmission block selected by the selection unit 107. Note that the processing performed in the wireless transmission units 110a and 110b is not limited to the example processing described above, and may be any processing generally performed in transmission operation in wireless communication.

After step S9, the transmission control unit 112 determines whether one frame has been transmitted (step S10), and if one frame has been transmitted (Yes at step S10), the process terminates. If one frame has not yet been transmitted (No at step S10), the transmission control unit 112 provides control to restart the process from step S1, in which case the transmission control unit 112 instructs, at step S1, the frame generation unit 101 to output the bits of the next block. By the process described above, the process from step S1 to step S9 is performed for each block.

Note that the example illustrated in FIG. 5 has been described in which the matrix output from the space-time block coding unit 103 is input to the differential unit 104 and to the code multiplication unit 106, but the transmission control unit 112 may instruct the space-time block coding unit 103 about to which unit the matrix is to be output based on the frame format. That is, the transmission control unit 112 may be configured to instruct the space-time block coding unit 103 to output the matrix to the code multiplication unit 106 when the interference measurement bits are output from the frame generation unit 101, and to output the matrix to the differential unit 104 when the synchronization bits or the data bits are output from the frame generation unit 101.

Figure 7:
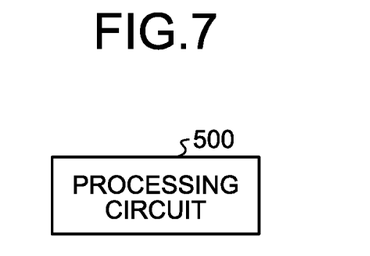
FIG. 7 is a diagram illustrating an example configuration of a processing circuit.

A hardware configuration of the base station 1 of the present embodiment will next be described. In the base station 1 of the present embodiment, the transmission antennas 111a and 111b are each an antenna, and the wireless transmission units 110a and 110b are each a transmitter. The frame generation unit 101, the mapping unit 102, the space-time block coding unit 103, the differential unit 104, the delay unit 105, the code multiplication unit 106, the selection unit 107, the transmit signal separation unit 108, the waveform shaping units 109a and 109b, and the transmission control unit 112 are implemented in a processing circuit. FIG. 7 is a diagram illustrating an example configuration of the processing circuit. A processing circuit 500 illustrated in FIG. 7 is a processing circuit configured as a dedicated circuit. The processing circuit 500 includes, for example, an application specific integrated circuit (ASIC), a field programmable gate array (FPGA), or a combination thereof.

Figure 8:
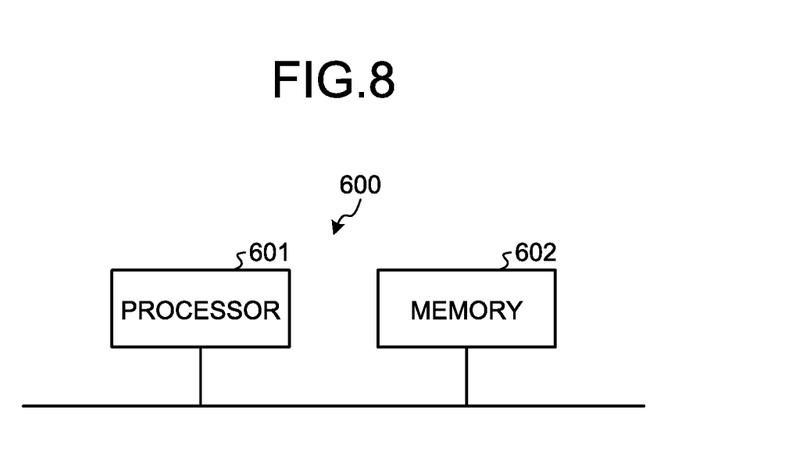
FIG. 8 is a diagram illustrating an example configuration of a processing circuit including a processor.

The processing circuit for implementing the frame generation unit 101, the mapping unit 102, the space-time block coding unit 103, the differential unit 104, the delay unit 105, the code multiplication unit 106, the selection unit 107, the transmit signal separation unit 108, the waveform shaping units 109a and 109b, and the transmission control unit 112 may be a processing circuit including a processor. FIG. 8 is a diagram illustrating an example configuration of a processing circuit 600 including a processor. The processing circuit 600 illustrated in FIG. 8 includes a processor 601 and a memory 602. The processor 601 is a central processing unit (CPU), a microprocessor, or the like. The memory 602 is a non-volatile or volatile semiconductor memory such as a random access memory (RAM), a read-only memory (ROM), or a flash memory; a magnetic disk, or the like.

In a case in which the processing circuit for implementing the frame generation unit 101, the mapping unit 102, the space-time block coding unit 103, the differential unit 104, the delay unit 105, the code multiplication unit 106, the selection unit 107, the transmit signal separation unit 108, the waveform shaping units 109a and 109b, and the transmission control unit 112 is implemented by the processing circuit 600 illustrated in FIG. 8, the functionality thereof is implemented by the processor 601 executing a program stored in the memory 602. The memory 602 is also used as a memory area when the processor 601 executes a program. Note that the frame generation unit 101, the mapping unit 102, the space-time block coding unit 103, the differential unit 104, the delay unit 105, the code multiplication unit 106, the selection unit 107, the transmit signal separation unit 108, the waveform shaping units 109a and 109b, and the transmission control unit 112 may be configured such that one or some of these components are implemented in the processing circuit 500 configured as a dedicated circuit, and the rest thereof are implemented in the processing circuit 600 including the processor 601.

Figure 9:
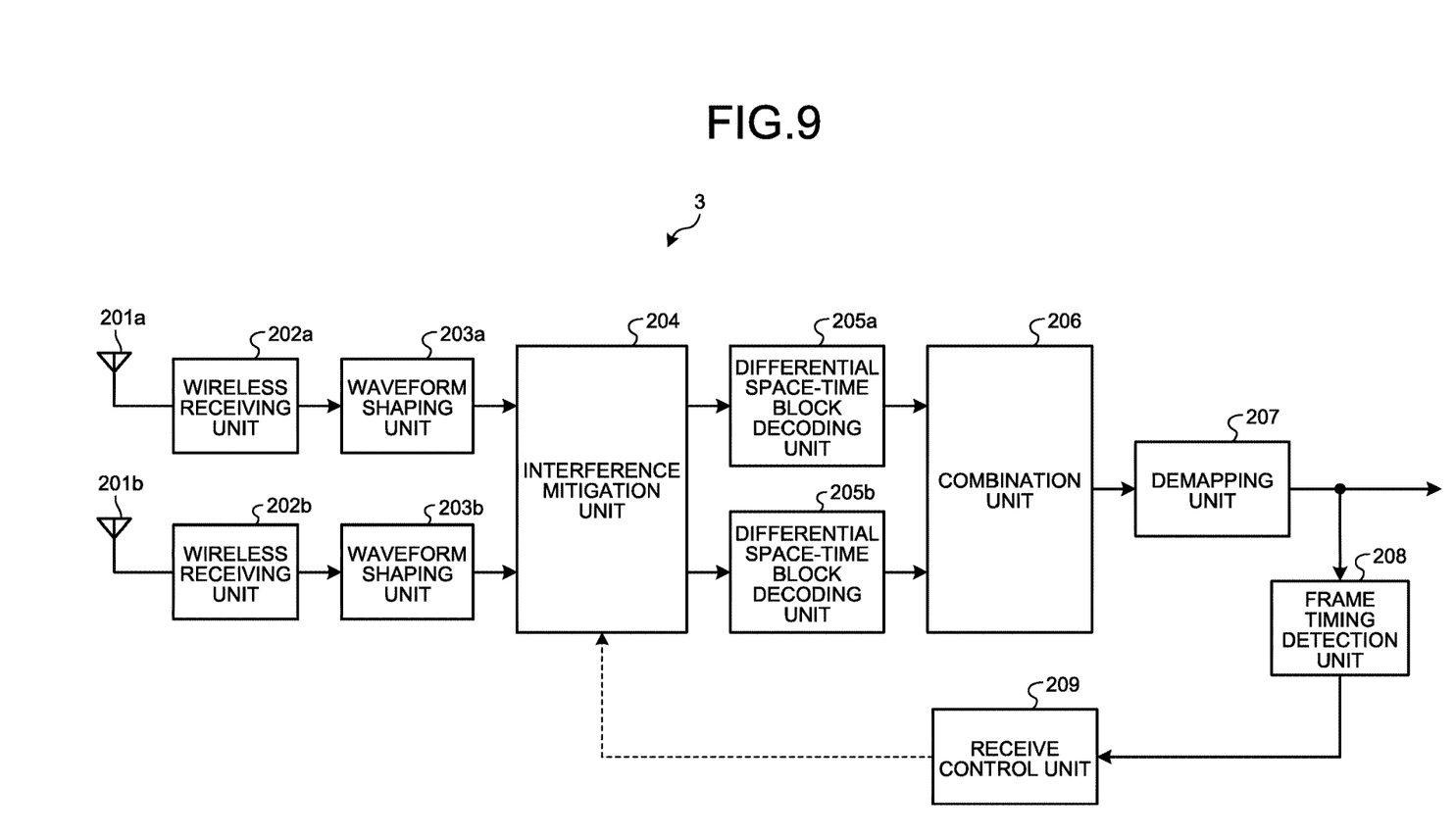
FIG. 9 is a diagram illustrating an example configuration of a mobile station.

The mobile station 3, which serves as a receiving device in downlink communication of the present embodiment, will next be described. FIG. 9 is a diagram illustrating an example configuration of the mobile station 3 of the present embodiment. As illustrated in FIG. 9, the mobile station 3 includes receiving antennas 201a and 201b, wireless receiving units 202a and 202b, waveform shaping units 203a and 203b, an interference mitigation unit 204, differential space-time block decoding units 205a and 205b, a combination unit 206, a demapping unit 207, a frame timing detection unit 208, and a receive control unit 209.

An operation of the mobile station 3 will now be described referring to FIG. 9. The mobile station 3 is a receiving device capable of receiving signals respectively transmitted from multiple ones of the base stations 1. The receiving antennas 201a and 201b are an example of set of multiple receiving antennas to each receive received signals including signals respectively transmitted from the multiple ones of the base stations 1. The number of the receiving antennas is not limited to 2. Note that the following description assumes that the mobile station 3 is in communication with the base station 1-1, and therefore a wireless signal transmitted from the base station 1-1 is the desired signal, while a wireless signal transmitted from the base station 1-2 is an interference signal.

The wireless receiving units 202a and 202b perform processing such as amplification, down-conversion, and analog-to-digital (AD) conversion on the respective signals received by the receiving antennas 201a and 201b, and output the respective processed signals to the waveform shaping units 203a and 203b. Note that the processing performed in the wireless receiving units 202a and 202b is not limited to the processing described above, and may be any receiving processing generally performed.

The waveform shaping units 203a and 203b process the signals respectively output from the wireless receiving units 202a and 202b to remove the signal components outside the bandwidth of the desired signal, and each shape the waveform of the desired signal using, for example, a root Nyquist filter. The waveform shaping process performed by the waveform shaping units 203a and 203b is not limited to processing using a root Nyquist filter.

The interference mitigation unit 204 performs interference mitigation processing. The following description describes the interference mitigation processing using an example of performing process using a zero forcing (ZF) technique, but the interference mitigation unit 204 may also perform the interference mitigation processing using another technique such as a minimum mean square error (MMSE) technique.

Figure 10:
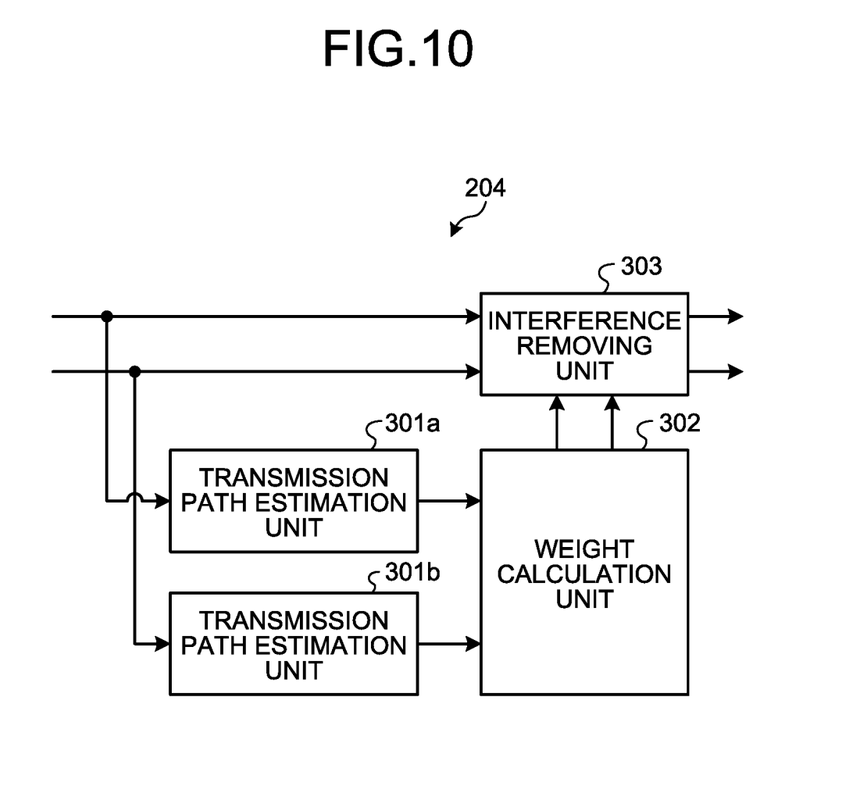
FIG. 10 is a diagram illustrating an example configuration of an interference mitigation unit.

FIG. 10 is a diagram illustrating an example configuration of the interference mitigation unit 204. As illustrated in FIG. 10, the interference mitigation unit 204 includes transmission path estimation units 301a and 301b, a weight calculation unit 302, and an interference removing unit 303.

Referring to FIG. 10, an operation of the interference mitigation unit 204 will now be described. Note that the operation timing of the interference mitigation unit 204 is controlled by the receive control unit 209. The receive control unit 209 provides control to cause the transmission path estimation units 301a and 301b and the weight calculation unit 302 to operate in the period for receiving the interference measurement signal, and to cause the interference removing unit 303 to operate in the period for receiving the synchronization signal and the data signal, based on the frame format.

The transmission path estimation units 301a and 301b perform transmission path estimation on the interference signals respectively contained in the signals respectively received from the receiving antennas 201a and 201b. Specifically, as described below, the transmission path estimation units 301a and 301b each separate, from the received signal, the interference signal, which is a signal transmitted from the transmission device that is acting as an interference source, i.e., the base station 1-2, and each estimate the transmission path of the interference signal with respect to the corresponding one of the receiving antennas 201a and 201b. In more detail, the transmission path estimation units 301a and 301b each estimate the transmission path of the interference signal using the interference measurement signal, i.e., the interference measurement bits for interference measurement contained in the received signal. Denoting the k-th block of the received signal received by the receiving antenna y (y=0, 1) by a combination of $r_{k,1}[y]$ and $r_{k,2}[y]$, the received signal matrix R(in bold)$_k$[y] can be represented by Formula (4), where y=0 indicates the receiving antenna 201a and y=1 indicates the receiving antenna 201b. The matrix C(in bold)$_k$ is a matrix representing the signal transmitted from the base station 1-1, and the matrix D(in bold)$_k$ is a matrix representing the signal transmitted from the base station 1-2. The matrix H(in bold)$_k$[y] is a matrix representing the transmission path between the base station 1-1 and the receiving antenna y of the mobile station 3, and the matrix G(in bold)$_k$[y] is a matrix representing the transmission path between the base station 1-2 and the receiving antenna y of the mobile station 3.

[Formula 4]

$$R_k[y] = \begin{bmatrix} r_{k,1}[y] \\ r_{k,2}[y] \end{bmatrix} \quad (4)$$
$$= C_k H_k[y] + D_k G_k[y]$$

Denoting the transmission path between the transmission antenna x (x=0, 1) of the base station 1-1 and the receiving antenna y (y=0, 1) of the mobile station 3 by $h_k[x,y]$, and the similar transmission path corresponding to the base station 1-2 by $g_k[x,y]$, the matrices of the matrix C(in bold)$_k$, the matrix D(in bold)$_k$, the matrix H(in bold)$_k$[y], and the matrix G(in bold)$_k$[y] can be respectively represented by Formulae (5), (6), (7), and (8). Note that x=0 indicates the transmission antenna 111a, and x=1 indicates the transmission antenna 111b.

[Formula 5]

$$C_k = \begin{bmatrix} c_{k,1} & c_{k,2} \\ -c_{k,2}^* & c_{k,1}^* \end{bmatrix} \quad (5)$$

[Formula 6]

$$D_k = \begin{bmatrix} d_{k,1} & d_{k,2} \\ -d_{k,2}^* & d_{k,1}^* \end{bmatrix} \quad (6)$$

[Formula 7]

$$H_k[y] = \begin{bmatrix} h_k[0, y] \\ h_k[1, y] \end{bmatrix} \quad (7)$$

[Formula 8]

$$G_k[y] = \begin{bmatrix} g_k[0, y] \\ g_k[1, y] \end{bmatrix} \quad (8)$$

Next, Formula (4) is multiplied by the code $f_k$ used for the base station 1-2, whose transmission path is to be estimated, and two blocks of the signal orthogonal to each other are then added together. This operation yields a result that can be expressed by Formula (9) assuming that a same signal is transmitted for these two blocks as illustrated in FIG. 3, that is, relationships of C(in bold)$_k$=C(in bold)$_{k+1}$ and D(in bold)$_k$=D(in bold)$_{k+1}$ hold, and the transmission paths do not change, that is, relationships of H(in bold)$_k$[y]=H(in bold)$_{k+1}$[y] and G(in bold)$_k$[y]=G(in bold)$_{k+1}$[y] hold.

[Formula 9]

$$\begin{aligned}R_k[y] + R_{k+1}[y] &= f_k \cdot (C_k H_k[y] + D_k G_k[y]) + \\ & \quad f_{k+1} \cdot (C_{k+1} H_{k+1}[y] - D_{k+1} G_{k+1}[y]) \\ &= 1 \cdot (C_k H_k[y] + D_k G_k[y]) + \\ & \quad (-1) \cdot (C_{k+1} H_{kା1}[y] + D_{k+1} G_{k+1}[y]) \\ &= 2 D_k G_k[y]\end{aligned} \quad (9)$$

Multiplication of Formula (9) above by the inverse matrix of the matrix D(in bold)$_k$ representing the transmit signal can yield the matrix G(in bold)$_k$[y] representing the transmission path of the base station 1-2 as given by Formula (10) below. The transmission path estimation units 301a and 301b each estimate the transmission path of the interference signal received by the corresponding one of the receiving antennas, based on Formula (10). Note that the code $f_k$ for the base station 1-2 is contained in the control signal transmitted from the base station 1-1, or contained in the data signal transmitted from the base station 1-1 to notify the mobile station 3 of the code $f_k$ from the base station 1-1.

[Formula 10]

$$G_k[y] = D_k^{-1}(R_k[y] + R_{k+1}[y])/2 \quad (10)$$

The weight calculation unit 302 uses estimated transmission path values $g_k[x,0]$ and $g_k[x,1]$ respectively output by the transmission path estimation units 301a and 301b to calculate three weights $w_{00}$, $w_{11}$, and $w_{01}$ by using Formulae (11) to (13). Note that when the receive control unit 209 instructs the weight calculation unit 302 to stop the interference mitigation processing, the values thereof will be $w_{00}=1$, $w_{11}=1$, and $w_{01}=0$.

[Formula 11]

$$w_{00} = \frac{\sqrt{1+|c|^2}}{1-|c|^2} \frac{1}{\sqrt{I_{00}}} \qquad (11)$$

[Formula 12]

$$w_{11} = \frac{\sqrt{1+|c|^2}}{1-|c|^2} \frac{1}{\sqrt{I_{11}}} \qquad (12)$$

[Formula 13]

$$w_{01} = -c \qquad (13)$$

In these formulae, parameters $I_{00}$, $I_{11}$, $I_{01}$, and c are given by Formulae (14), (15), (16), (17), and (18).

[Formula 14]

$$I_{00} = \overline{|q_k[0,0]+q_k[1,0]|^2} \qquad (14)$$

[Formula 15]

$$I_{11} = \overline{|q_k[0,1]+q_k[1,1]|^2} \qquad (15)$$

[Formula 16]

$$I_{01} = \overline{(q_k[0,0]+g_k[1,0])(q_k[0,1]+g_k[1,1])^*} \qquad (16)$$

[Formula 17]

$$c = \frac{1-\sqrt{1-|\rho|^2}}{|\rho|^2}\rho \qquad (17)$$

[Formula 18]

$$\rho = \frac{I_{01}}{\sqrt{I_{00}I_{11}}} \qquad (18)$$

The interference removing unit 303 removes the interference signal from the received signal $r_k[y]$ from each of the receiving antennas using the corresponding one of Formulae (19) and (20) below, and outputs a signal $q_k[y]$ with the interference signal removed, to the corresponding one of the differential space-time block decoding units 205a and 205b. That is, the interference removing unit 303 removes the interference signal in the received signal received by a first receiving antenna, which is one of the multiple receiving antennas, using the received signal received from a second receiving antenna, which is a receiving antenna other than the first receiving antenna, using the result of estimation of the transmission path of the interference signal. In regard to Formula (19) below, the first receiving antenna is the receiving antenna 201a corresponding to the value y=0, and the second receiving antenna is the receiving antenna 201b corresponding to the value y=1. In regard to Formula (20), the first receiving antenna is the receiving antenna 201b corresponding to the value y=1, and the second receiving antenna is the receiving antenna 201a corresponding to the value y=0.

[Formula 19]

$$q_k[0]=r_k[0]\cdot w_{00}+r_k[1]\cdot w_{01} \qquad (19)$$

[Formula 20]

$$q_k[1]=r_k[1]\cdot w_{11}+r_k[0]\cdot w_{01}^* \qquad (20)$$

The differential space-time block decoding units 205a and 205b each generate a matrix on a block-by-block basis using received signal components $q_{k,1}[y]$ and $q_{k,2}[y]$ having interference components removed from the signal received by the corresponding one of the receiving antennas 201a and 201b, and each output an estimated transmission symbol value for the receiving antenna y after performing differential space-time block decoding as given by Formula (21).

[Formula 21]

$$\hat{S}_k[y]=Q_k[y]+Q_{k-1}^H[y] \qquad (21)$$

In the formula, the matrix $Q_k[y]$, $\hat{s}_k[y]$ is represented by Formulae (22) and (23) below.

[Formula 22]

$$Q_k[y] = \begin{bmatrix} q_{k,1}[y] & -q_{k,2}^*[y] \\ q_{k,2}[y] & q_{k,1}^*[y] \end{bmatrix} \qquad (22)$$

[Formula 23]

$$\hat{S}_k[y] = \begin{bmatrix} \hat{s}_{k,1}[y] & \hat{s}_{k,2}[y] \\ -\hat{s}_{k,2}^*[y] & \hat{s}_{k,1}^*[y] \end{bmatrix} \qquad (23)$$

As given by Formulae (24) and (25), the combination unit 206 sums up the estimated transmission symbol value $\hat{s}_{k,1}[y]$ and sums up the estimated transmission symbol value $\hat{s}_{k,2}[y]$ for the respective receiving antennas to respectively obtain the estimated transmission symbol values $\hat{s}_{k,1}$ and $\hat{s}_{k,2}$. The combination unit 206 outputs the estimated transmission symbol values $\hat{s}_{k,1}$ and $\hat{s}_{k,2}$ to the demapping unit 207.

[Formula 24]

$$\hat{s}_{k,1}=\hat{s}_{k,1}[0]+\hat{s}_{k,1}[1] \qquad (24)$$

[Formula 25]

$$\hat{s}_{k,2}=\hat{s}_{k,2}[0]+\hat{s}_{k,2}[1] \qquad (25)$$

The demapping unit 207 converts each of the estimated symbol values output from the combination unit 206 into a bit series. For example, in a case in which the base station 1 has performed mapping for QPSK, the demapping unit 207 performs demapping for QPSK. In a case in which the base station 1 has performed mapping for QPSK, a single estimated symbol value may be converted into two bits in demapping such that the demapping unit 207 determines the bit values based on the signs of the imaginary part and of the real part of the estimated symbol value that is a complex number. Specifically, each of the two bits is determined as 0 for a positive value, and as 1 for a negative value, depending on the signs of the imaginary part and of the real part.

The frame timing detection unit 208 extracts the synchronization signal, i.e., the synchronization bit series, from the bit series obtained by conversion in demapping. The known position of the synchronization bit series in a frame enables the frame timing, i.e., the timing of the beginning of a frame, to be known from the timing of extraction of the synchronization bit series.

The receive control unit 209 controls the operation of the interference mitigation unit 204 based on the frame timing detected by the frame timing detection unit 208. Specifically, the receive control unit 209 controls the interference mitigation unit 204 to cause the transmission path estimation units 301a and 301b and the weight calculation unit 302 of the interference mitigation unit 204 to operate when the interference measurement signal is being received. The receive control unit 209 also controls the interference mitigation unit 204 to cause the interference removing unit 303 to operate when the synchronization signal or the data signal is being received. Note that when the frame timing is unclear, such as when the mobile station 3 has just started receiving a signal from the base station 1, the receive control unit 209 provides control to stop the interference mitigation processing.

As described above, the present embodiment has been described in which the base station 1 performs differential space-time block coding on the synchronization signal and on the data signal, and performs space-time block coding on the interference measurement signal, and then transmits the synchronization signal, the data signal, and the interference measurement signal. That is, a transmission block to be transmitted by the base station 1 includes an interference measurement block including interference measurement bits for interference measurement, and the code multiplication unit 106 multiplies the interference measurement block by a code. The transmission block also includes a data block including information to be transmitted, and the differential unit 104 performs a differential operation on the data block. This eliminates the need for the mobile station 3 having received a signal transmitted from the base station 1 to perform transmission path estimation during decoding of the data signal, but allows transmission path estimation to be performed using the interference measurement signal received, thereby enabling interference mitigation processing to be performed. In addition, this enables interference mitigation to be provided for differential space-time block coding in a transmission device and in a receiving device both having a simple configuration.

The configurations described in the foregoing embodiment are merely examples of various aspects of the present invention. These configurations may be combined with a known other technology, and moreover, a part of such configurations may be omitted and/or modified without departing from the spirit of the present invention.

REFERENCE SIGNS LIST 1, 1-1, 1-2 base station; 2-1, 2-2 communication area; 3 mobile station; 4 control station; 10 wireless communication system; 101 frame generation unit; 102 mapping unit; 103 space-time block coding unit; 104 differential unit; 105 delay unit; 106 code multiplication unit; 107 selection unit; 108 transmit signal separation unit; 109a, 109b waveform shaping unit; 110a, 110b wireless transmission unit; 111a, 111b transmission antenna; 112 transmission control unit; 201a, 201b receiving antenna; 202a, 202b wireless receiving unit; 203a, 203b waveform shaping unit; 204 interference mitigation unit; 205a, 205b differential space-time block decoding unit; 206 combination unit; 207 demapping unit; 208 frame timing detection unit; 209 receive control unit; 301a, 301b transmission path estimation unit; 302 weight calculation unit; 303 interference removing unit.

The invention claimed is:

1. A transmission device comprising:
a space-time block coding circuitry to perform space-time block coding on a transmission symbol to generate a transmission block;
a differential circuitry to perform a differential operation on the transmission block;
a code multiplication circuitry to multiply the transmission block by a code;
a selection circuitry to select one of the transmission block after the differential operation and the transmission block after the code multiplication based on whether it is a period for transmitting an interference measurement block; and
a transmitter to transmit the transmission block selected.

2. The transmission device according to claim 1, wherein the transmission block includes an interference measurement block including interference measurement bits for interference measurement, and
the code multiplication circuitry multiplies the interference measurement block by the code.

3. The transmission device according to claim 2, wherein the transmission block includes a data block including data representing information to be transmitted, and
the differential circuitry performs the differential operation on the data block.

4. The transmission device according to claim 2, wherein two identical ones of the interference measurement block are consecutively transmitted.

5. The transmission device according to claim 1, wherein the code is determined for every one of the transmission device.

6. A receiving device capable of receiving signals transmitted from multiple respective ones of the transmission device according to claim 1, the receiving device comprising:
a plurality of receiving antennas to each receive a received signal including signals transmitted from the plurality of transmission devices, the received signal including differential space-time coded (DSTBC) blocks and space-time block coded (STBC) blocks;
a transmission path estimation circuitry to estimate a transmission path of an interference signal for each of the receiving antennas by separating, from the received signal, an interference signal, the interference signal being a signal transmitted from one of the transmission devices acting as an interference source; and
an interference removing circuitry to remove an interference signal in the received signal received by a first receiving antenna, being one of the plurality of receiving antennas, using the received signal received by a second receiving antenna, being one of the receiving antennas other than the first receiving antenna, using a result of estimation of the transmission path.

7. The receiving device according to claim 6, wherein the transmission path estimation circuitry estimates the transmission path of the interference signal using interference measurement bits for interference measurement contained in the received signal.

8. A wireless communication system comprising:
multiple transmission devices each including:
a space-time block coding circuitry to perform space-time block coding on a transmission symbol to generate a transmission block;
a differential circuitry to perform a differential operation on the transmission block;

a code multiplication circuitry to multiply the transmission block by a code;
a selection circuitry to select one of the transmission block after the differential operation and the transmission block after the code multiplication based on whether it is a period for transmitting an interference measurement block; and
a transmitter to transmit the transmission block selected; and
the receiving device according to claim 6, capable of receiving signals transmitted from the transmission devices.

9. A control circuit comprising:
a differential circuitry to receive a transmission block and perform a differential operation on the transmission block, the transmission block being generated by performing space-time block coding on a transmission symbol;
a code multiplication circuitry to receive the transmission block and multiply the transmission block by a code;
a selection circuitry to select one of the transmission block after the differential operation and the transmission block after the code multiplication; and
a transmission control circuitry determines whether it is in the period for transmitting an interference measurement signal included in a frame based on a frame format,
wherein when the transmission control circuitry determined that it is in the period for transmitting the interference measurement signal, the transmission control circuitry instructs the selection circuitry to select the transmission block after the differential operation, and the selection circuitry then selects the transmission block after the differential operation as instructed by the transmission control circuitry, and outputs the selected transmission block as a wireless signal, and
wherein when the transmission control circuitry determined that it is not in the period for transmitting the interference measurement signal, the transmission control circuitry instructs the selection circuitry to select the transmission block after the code multiplication, and the selection circuitry then selects the transmission block after the code multiplication as instructed by the transmission control circuitry, and outputs the selected transmission block as a wireless signal.

10. A non-transitory computer-readable recording medium that stores therein a program that instructs a computer to execute:
performing space-time block coding on a transmission symbol to generate a transmission block;
performing a differential operation on the transmission block;
multiplying the transmission block by a code;
selecting one of the transmission block after the differential operation and the transmission block after the code multiplication based on whether it is a period for transmitting an interference measurement block; and
transmitting the transmission block selected.

* * * * *